United States Patent
van der Weele et al.

(10) Patent No.: US 8,779,040 B2
(45) Date of Patent: Jul. 15, 2014

(54) HIGH-HEAT POLYCARBONATE BLENDS THAT ARE HALOGEN-FREE AND FLAME RETARDANT

(71) Applicant: Sabic Innovative Plastics, Pittsfield, MA (US)

(72) Inventors: Chris van der Weele, Bergen op Zoom (NL); Johannes Hubertus Gabriel Marie Lohmeijer, Bergen op Zoom (NL); Andries J. P. van Zyl, Bergen op Zoom (NL)

(73) Assignee: SABIC Global Technologies B.V., Pittsfield, MA (US)

( * ) Notice: Subject to any disclaimer, the term of this patent is extended or adjusted under 35 U.S.C. 154(b) by 0 days.

(21) Appl. No.: 13/652,855

(22) Filed: Oct. 16, 2012

(65) Prior Publication Data
US 2014/0107264 A1 Apr. 17, 2014

(51) Int. Cl.
*C08K 5/521* (2006.01)
*C08K 5/523* (2006.01)
*C08K 5/5399* (2006.01)
*C08K 5/5333* (2006.01)
*C08L 69/00* (2006.01)
*C08L 83/10* (2006.01)

(52) U.S. Cl.
CPC .............. *C08K 5/5399* (2013.01); *C08K 5/523* (2013.01); *C08K 5/5333* (2013.01); *C08L 69/00* (2013.01); *C08L 83/10* (2013.01)
USPC ........... 524/127; 524/116; 524/123; 524/126; 524/130; 524/133; 524/138; 524/140; 524/141

(58) Field of Classification Search
USPC ......... 524/116, 123, 126, 127, 130, 133, 136, 524/138, 140, 141
See application file for complete search history.

(56) References Cited

U.S. PATENT DOCUMENTS

| | | |
|---|---|---|
| 5,455,310 A | 10/1995 | Hoover et al. |
| 7,232,854 B2 | 6/2007 | Ma et al. |
| 7,277,230 B2 | 10/2007 | Srinivasan et al. |
| 7,358,321 B2 | 4/2008 | Mahood et al. |
| 7,365,124 B2 | 4/2008 | Srinivasan et al. |
| 7,408,016 B2 | 8/2008 | Chatterjee et al. |
| 7,888,447 B2 | 2/2011 | Dhara et al. |
| 7,935,777 B2 | 5/2011 | de Kraker et al. |
| 2007/0149661 A1 | 6/2007 | Charati et al. |
| 2008/0033123 A1 | 2/2008 | Srinivasan et al. |
| 2008/0161507 A1 | 7/2008 | Chakravarti et al. |
| 2013/0190425 A1* | 7/2013 | Zhu et al. ...................... 523/451 |
| 2013/0270591 A1* | 10/2013 | de Brouwer et al. ........... 257/98 |

* cited by examiner

*Primary Examiner* — Peter Szekely
(74) *Attorney, Agent, or Firm* — Honigman Miller Schwartz and Cohn LLP; Heidi M. Berven

(57) ABSTRACT

The present invention is directed to a composition comprising:
(a) a polyethylene terephthalate;
(b) a copolycarbonate of 2-phenyl-3,3-bis(4-hydroxyphenyl)phthalimidine (PPPBP) and another bisphenol;
(c) a polycarbonate-polysiloxane copolymer; and
(d) a non-halogenated flame retardant.

The invention is also directed to processes for making such compositions as well as articles derived therefrom.

13 Claims, No Drawings

HIGH-HEAT POLYCARBONATE BLENDS THAT ARE HALOGEN-FREE AND FLAME RETARDANT

BACKGROUND

As the popularity of electric vehicles as alternatives to gas-powered vehicles increases in the United States and elsewhere, there is a growing need for plastics that can be used as wire and plug covers for electric vehicle recharging units. Some of these electric vehicle charging units are stationary, while others are portable. So-called electric vehicle supply equipment having a cord connector conveniently enables charging of electric vehicle batteries. The plastics that are used in these units must meet various safety standards relating to flame retardance and thermal stability. These standards include UL94 V-0, the glow wire flammability test, and the ball pressure test.

UL94 is the most rigorous plastics flammability vertical standard from Underwriters Laboratories (USA). A "V-0" rating according to UL 94 means that a vertical plastic sample that has been ignited by a flame stops burning within 10 seconds. The total flaming combustion time of the sample cannot exceed 50 seconds, and ignited samples cannot drip flaming particles. Finally, the ignited sample cannot have glowing combustion more than 30 seconds after the flame is removed.

The glow wire flammability test is used to simulate the heat that may result from a malfunctioning electrical device, such as electrically overloaded or glowing components. The test offers a way to compare the ability of various materials to extinguish flames and to compare their propensity to produce particles capable of spreading fire. In the test, a sample is held against a glowing wire for 30 seconds. The glow wire is removed, and the time for the flames to extinguish is recorded. The glow wire flammability index is the highest temperature where there is no flame or glowing (no ignition) and/or glowing time is less than 30 seconds.

The ball pressure test is used to determine dimensional stability under stress at elevated temperature. It is used to test the performance of plastic insulating materials that are used in electrical appliances, wiring accessories, lights, motors, connectors, and so on. The test is designed to evaluate heat resistance in order to ensure that the external parts of the insulating material do not excessively soften when heated.

Moreover, there is also a demand for plastics that are more environmentally friendly and thus that are halogen-free. As a result, there is an ongoing need for flame retardant, non-halogenated plastic materials that can be used in a range of products, including as coverings for electric wires and plugs.

SUMMARY OF THE INVENTION

These and other needs are met by the present invention, which is directed to a composition comprising:
(a) 10 to 50 percent by weight of a polyethylene terephthalate
(b) 20 to 70 percent by weight of Polycarbonate A which is a copolycarbonate of 2-phenyl-3,3-bis(4-hydroxyphenyl)phthalimidine (PPPBP) and another bisphenol;
(c) 10 to 60 percent by weight of Polycarbonate B, which is a polycarbonate-polysiloxane copolymer; and
(d) 4 to 10 percent by weight of a non-halogenated flame retardant, provided that when the non-halogenated flame retardant is an organophosphate, organophosphonate, or organophosphinate, the weight percent is 4 to 7 percent by weight; wherein:

the weight percents are based on the total weight of the composition and the composition passes the following tests:
(i) the Ball Pressure Test according to (IEC) DIN EN 60695-10-2, VDE 0471 Part 10-2 or (IEC) DIN EN 60335-1 at 125° C.; or
(ii) the Glow Wire Flammability Test (IEC) 60695-2-12 at 850° C.; and
(iii) has a UL94 Vertical Flame Rating, V-0 at 1.5 mm.

In another aspect, the invention is directed to a composition comprising:
(a) 10 to 50 percent by weight of a polyethylene terephthalate
(b) 20 to 70 percent by weight of Polycarbonate A which is a copolycarbonate of 2-phenyl-3,3-bis(4-hydroxyphenyl)phthalimidine (PPPBP) and another bisphenol;
(c) 10 to 60 percent by weight of Polycarbonate B, which is a polycarbonate-polysiloxane copolymer; and
(d) 4 to 7 percent by weight of a non-halogenated flame retardant, wherein:

the weight percents are based on the total weight of the composition; and the composition passes the following tests:
(i) the Ball Pressure Test according to (IEC) DIN EN 60695-10-2, VDE 0471 Part 10-2 or (IEC) DIN EN 60335-1 at 125° C.; or
(ii) the Glow Wire Flammability Test (IEC) 60695-2-12 at 850° C.; and
(iii) has a UL94 Vertical Flame Rating, V-0 at 1.5 mm.

"Passing the Ball Pressure Test" means that there was a ball indentation of 2 mm or less at the tested temperature.

"Passing the Glow Wire Test" means that any flames or glowing on sample extinguish within 30 seconds after removal of the glow wire.

The invention is also directed to processes for making such compositions as well as articles derived therefrom.

DETAILED DESCRIPTION OF THE INVENTION

All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein weight percents are based on a 100 weight percent composition.

The compositions described and claimed herein are "non-halogenated." "Non-halogenated" means that the compositions are essentially free of halogenated components, such as those containing the halogens chlorine or bromine, meaning that they are produced without the intentional addition of halogen-containing materials. It is understood, however, that in facilities that process multiple products a certain amount of cross contamination can occur resulting in bromine and/or chlorine levels typically on the parts per million by weight scale. With this understanding it can be readily appreciated that essentially free of halogen may be defined as having a bromine and/or chlorine content of less than or equal to about 100 parts per million by weight (ppm), less than or equal to about 75 ppm, or less than or equal to about 50 ppm.

The flame retardants used in the compositions disclosed and claimed herein are non-halogenated. As used herein, "non-halogenated flame retardant" refers to flame retardants that do not intentionally contain halogens such as Cl or Br. It is understood, however, that in facilities that process multiple products a certain amount of cross contamination can occur resulting in halogen levels typically on the parts per million by weight scale. With this understanding it can be readily appreciated that "non-halogenated flame retardant" may be defined as having a halogen content of less than or equal to about 1000 parts per million by weight (ppm), less than or equal to about 500 ppm, or less than or equal to about 250 ppm. When the definition "non-halogenated flame retardant" is applied to the flame retardant, it is based on the total weight of the flame retardant. When the definition "non-halogenated flame retardant" is applied to the thermoplastic composition, it is based on the total weight of polyester, polycarbonate, and flame retardant.

Components

Polyester

The composition comprises a polyester of formula 1:

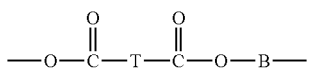

Formula 1 wherein:

B is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

Various polyesters can be used in this invention, but thermoplastic polyesters that are obtained by polymerizing dicarboxylic acids and dihydroxy compounds are particularly preferred. The polyesters can be a single kind of thermoplastic polyester used alone, or two or more kinds used in combination. Furthermore, copolyesters can also be used as needed.

Aromatic dicarboxylic acids, for example, terephthalic acid, isophthalic acid, naphthalene dicarboxylic acid and the like, can be used as these bifunctional carboxylic acids, and mixtures of these can be used as needed. Among these, terephthalic acid is particularly preferred. Also, to the extent that the effects of this invention are not lost, other bifunctional carboxylic acids such as aliphatic dicarboxylic acids can be used, such as oxalic acid, malonic acid, adipic acid, suberic acid, azelaic acid, sebacic acid, decane dicarboxylic acid, and cyclohexane dicarboxylic acid; and their ester-modified derivatives can also be used.

As dihydroxy compounds, straight chain aliphatic and cycloaliphatic diols having 2 to 15 carbon atoms can be used; for example, ethylene glycol, propylene glycol, 1,4-butanediol, trimethylene glycol, tetramethylene glycol, neopentyl glycol, diethylene glycol, cyclohexane dimethanol, heptane-1,7-diol, octane-1,8-diol, decane-1,10-diol, etc.; polyethylene glycol; bivalent phenols such as dihydroxydiarylalkanes such as 2,2-bis(4-hydroxylphenyl)propane that can be called bisphenol-A, bis(4-hydroxyphenyl) methane, bis(4-hydroxyphenyl)naphthylmethane, bis(4-hydroxyphenyl)phenylmethane, bis(4-hydroxyphenyl)-(4-isopropylphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3-methyl-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane, and dihyroxydiarylcycloalkanes such as 1,1-bis(4-hydroxyphenyl)cyclohexane, and 1,1-bis(4-hydroxyphenyl)cyclodecane; dihydroxydiarylsulfones such as bis(4-hydroxyphenyl)sulfone, and bis(3,5-dimethyl-4-hydroxyphenyl)sulfone, dihydroxydiarylethers such as bis(4-hydroxyphenyl)ether, and bis(3-5-dimethyl-4-hydroxyphenyl)ether; dihydroxydiaryl ketones such as 4,4'-dihydroxybenzophenone, and 3,3',5,5'-tetramethyl-4,4-dihydroxybenzophenone; dihydroxydiaryl sulfides such as bis(4-hydroxyphenyl)sulfide, bis(3-methyl-4-hydroxyphenyl)sulfide, and bis(3,5-dimethyl-4-hydroxyphenyl)sulfide; dihydroxydiaryl sulfoxides such as bis(4-hydroxyphenyl)sulfoxide; dihydroxydiphenyls such as 4,4'-dihydroxyphenyl; dihydroxyarylfluorenes such as 9,9-bis(4-hydroxyphenyl)fluorene; dihydroxybenzenes such as hydroxyquinone, resorcinol, and methylhydroxyquinone; and dihydroxynaphthalenes such as 1,5-dihydroxynaphthalene and 2,6-dihydroxynaphthalene. Also, two or more kinds of dihydroxy compounds can be combined as needed.

In a specific embodiment, the polyester is poly(ethylene terephthalate) (PET), poly(1,4-butylene terephthalate) (PBT), poly(ethylene naphthalate) (PEN), poly(butylene naphthalate) (PBN), and poly(1,3-propylene terephthalate) (PPT), and poly(cyclohexylenedimethylene terephthalate) (PCT), polytrimethylene terephthalate (PTT), poly (1,4-butylene succinate) (PBS), glycol modified polycyclohexylenedimethylene terephthalate (PCTG/PETG), poly(1,4-cyclohexylenedimethylene) 1,4-cyclohexanedicarboxylic acid (PCCD), or combinations thereof. In one embodiment, the polyester is PET, PBT or a mixture thereof.

More particularly, the polyester is selected from the group consisting of poly(ethylene terephthalate) (PET), poly(1,4-butylene terephthalate) (PBT), poly(ethylene naphthalate) (PEN), poly(butylene naphthalate) (PBN), and poly(1,3-propylene terephthalate) (PPT), poly(cyclohexylene-dimethylene terephthalate) (PCT) or blends thereof. More specifically, the polyester can be PBT or PET.

More specifically, the polyester is PBT with a weight average molecular weight (Mw) of 10,000 to 150,000, and more specifically from 40,000 to 110,000. Mw is measured with SEC in HFiP/CHCl$_3$ using PS calibration standards.

In one embodiment, the composition comprises about 30 to about 80 percent by weight of a polyester based on the total weight of the composition. In another embodiment, the composition comprises 40 to about 70 percent by weight of a polyester. In another embodiment, the composition comprises 50 to about 60 percent by weight of a polyester. In another embodiment, the composition comprises 52 to about 58 percent by weight of a polyester. In another embodiment, the composition comprises 54 to about 57 percent by weight of a polyester. In a particular embodiment, the polyester is PBT.

In another embodiment, the composition comprises about 10 to about 50 percent by weight of a polyester. In another embodiment, the composition comprises 12 to about 48 percent by weight of a polyester. In another embodiment, the composition comprises 14 to about 30 percent by weight of a polyester. In another embodiment, the composition comprises 15 to about 28 percent by weight of a polyester. In another embodiment, the composition comprises 10 to 20 percent by weight of a polyester. In another embodiment, the composition comprises 15 to 25 percent by weight of a polyester. In another embodiment, the composition comprises 20 to 30 percent by weight of a polyester. In these and other embodiments, the polyester can be any of the polyesters described in this section.

Polycarbonate A

In addition to the polyester, the composition comprises a polycarbonate, referred to as "Polycarbonate A." As used herein, the terms "polycarbonate" and "polycarbonate polymer" mean compositions having repeating structural carbonate units of the formula:

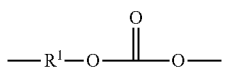

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula: $-A^1-Y^1-A^2-$ wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of the formula HO-$A^1$-$Y^1$-$A^2$-OH wherein $Y^1$, $A^1$ and $A^2$ are as described above. Also included are bisphenol compounds of the general formula:

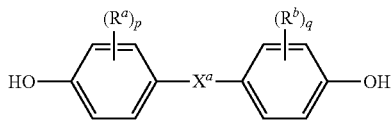

wherein $R^a$ and $R^b$ each represent a halogen atom or a monovalent hydrocarbon group and may be the same or different; p and q are each independently integers of 0 to 4; and $X^a$ represents one of the groups of the formula:

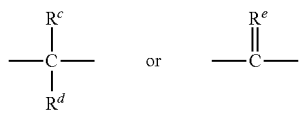

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2-phenyl-3,3-bis(4-hydroxyphenyl)phthalimidine (PPPBP), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl) butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl) propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), trimesic acid, and benzophenone tetracarboxylic acid. The branching agents may be added at a level of about 0.05 weight percent (wt %) to about 2.0 wt %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Rather than utilizing the dicarboxylic acid per se, it is possible, and sometimes even desired, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or a $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

"Polycarbonates" and "polycarbonate polymers" as used herein further includes blends of polycarbonates with other copolymers comprising carbonate chain units. An exemplary copolymer is a polyester carbonate, also known as a copolyester-polycarbonate. Such copolymers further contain, in addition to recurring carbonate chain units of the formula

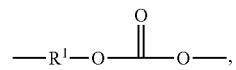

repeating units of the formula:

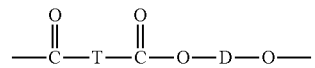

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of the formula:

wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by this formula include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In other embodiments, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula:

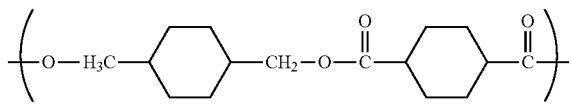

wherein, as described using formula (6), D is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

Another exemplary copolymer comprises polycarbonate blocks and polydiorganosiloxane blocks, also known as a polycarbonate-polysiloxane copolymer. The polycarbonate blocks in the copolymer comprise repeating structural units of formula

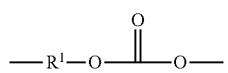

as described above, for example wherein $R^1$ is -$A^1$-$Y^1$-$A^2$- as described above. These units may be derived from reaction of dihydroxy compounds of formula

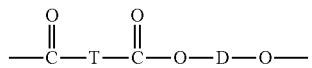

as described above.

Polycarbonate A is a polycarbonate derived from 2-phenyl-3,3-bis(4-hydroxyphenyl)phthalimidine (PPPBP), which has the structure:

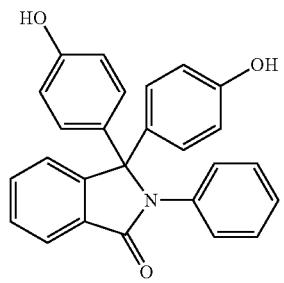 [SMILES: O=C1c2ccccc2C(c2ccc(O)cc2)(c2ccc(O)cc2)N1c1ccccc1]

The para, para form of PPPBP (the hydroxyls groups are in the para position) is preferred to the ortho-para form, which is an undesired byproduct.

Polycarbonate polymer (A) is generally a copolymer of PPPBP and another monomer. The molar ratio of PPPBP to the other monomer may be from about 10:90 to about 90:10, from about 20:80 to about 80:20, from about 25:75 to about 75:25, from about 30:70 to about 70:30, from about 32:68 to about 68:32, or about 50:50. Desirably, the molar ratio is from about 20:80 to about 80:20.

In specific embodiments, polymer (A) is a copolymer of PPPBP and bisphenol-A, as shown below:

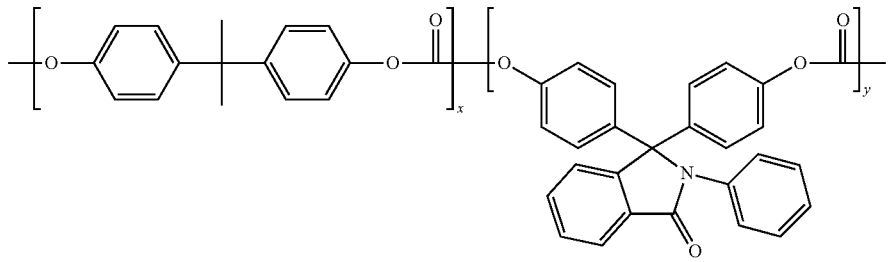

where x and y are the molar percentage of the bisphenol-A and PPPBP monomers, respectively. The PPPBP is present in the amount of from about 20 to about 80 mole percent of the copolymer.

In one embodiment, the PPPBP-bisphenol A copolymer has a weight average molecular weight of approximately 24,000 to 26,000 Daltons for a sample containing approximately 30 to 40 mole percent of PPPBP.

In one embodiment, the composition comprises about 20 to about 70 percent by weight of Polycarbonate A. In another embodiment, the composition comprises 25 to about 65 percent by weight of Polycarbonate A. In another embodiment, the composition comprises 30 to about 60 percent by weight of Polycarbonate A. In another embodiment, the composition comprises 32 to about 58 percent by weight of Polycarbonate A. In another embodiment, the composition comprises 25 to 35 percent by weight of Polycarbonate A. In another embodiment, the composition comprises 35 to 45 percent by weight of Polycarbonate A. In another embodiment, the composition comprises 45 to 55 percent by weight of Polycarbonate A. In these and other embodiments, Polycarbonate A is a PPPBP-bisphenol A copolymer.

Polycarbonate B

The composition also comprises polycarbonate B, which is a polycarbonate-siloxane copolymer. The polydiorganosiloxane blocks comprise repeating structural units of the formula (sometimes referred to herein as "siloxane"):

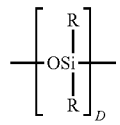

wherein each occurrence of R is same or different, and is a $C_{1-13}$ monovalent organic radical. For example, R may be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-10}$ aryl group, $C_{6-10}$ aryloxy group, $C_{7-13}$ aralkyl group, $C_{7-13}$ aralkoxy group, $C_{7-13}$ alkaryl group, or $C_{7-13}$ alkaryloxy group. Combinations of the foregoing R groups may be used in the same copolymer.

The value of D in

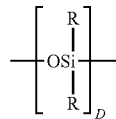

may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of the formula:

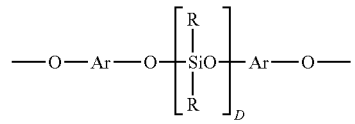

wherein D is as defined above; each R may be the same or different, and is as defined above; and Ar may be the same or different, and is a substituted or unsubstituted $C_{6-30}$ arylene radical, wherein the bonds are directly connected to an aromatic moiety. Suitable Ar groups in this formula may be derived from a $C_{6-30}$ dihydroxyarylene compound, for example a dihydroxyarylene compound of formula $HO\text{-}A^1\text{-}Y^1\text{-}A^2\text{-}OH$,

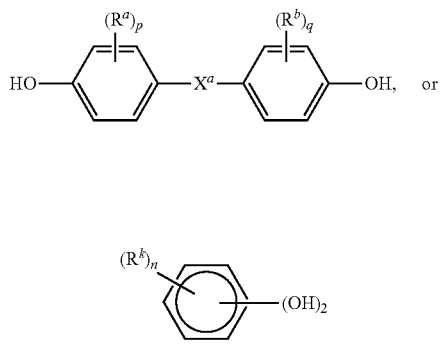

above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl) propane. Combinations comprising at least one of the foregoing dihydroxy compounds may also be used.

Such units may be derived from the corresponding dihydroxy compound of the following formula:

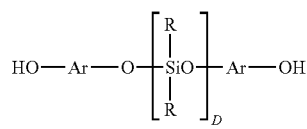

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of the formula:

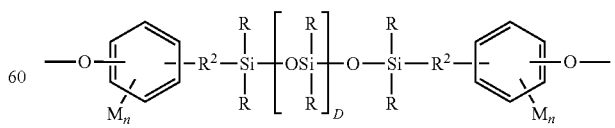

wherein R and D are as defined above. $R^2$ in this formula is a divalent $C_{2-8}$ aliphatic group. Each M in this formula may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkaryl, or $C_{7-12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl or tolyl; $R^2$ is a dimethylene, trimethylene or tetramethylene group; and R is a $C_{1-8}$ alkyl, cyanoalkyl, or aryl such as phenyl, or tolyl. In another embodiment, R is methyl or a mixture of methyl and phenyl. In still another embodiment, M is methoxy, n is one, $R^2$ is a divalent $C_{1-3}$ aliphatic group, and R is methyl.

These units may be derived from the corresponding dihydroxy polydiorganosiloxane:

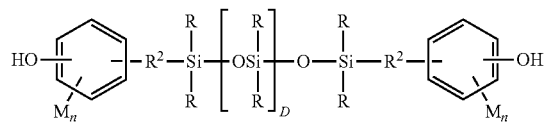

wherein R, D, M, $R^2$, and n are as described above.

Such dihydroxy polysiloxanes can be made by effecting a platinum catalyzed addition between a siloxane hydride of the formula:

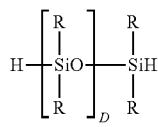

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

A polycarbonate-polysiloxane copolymer may be manufactured by reaction of diphenolic polysiloxane with a carbonate source and a dihydroxy aromatic compound, optionally in the presence of a phase transfer catalyst as described above. Suitable conditions are similar to those useful in forming polycarbonates. For example, the copolymers are prepared by phosgenation, at temperatures from below 0° C. to about 100° C., desirably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above. Siloxane groups may also be present at or attached to the ends of the copolymer as well.

In the production of a polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt % to about 99 wt % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt % to about 75 wt %, or about 1 wt % to about 50 wt % polydimethylsiloxane, or an equivalent molar amount of another polydiorganosiloxane. In one embodiment, the copolymer comprises about 5 wt % to about 40 wt %, optionally about 5 wt % to about 25 wt % polydimethylsiloxane, or an equivalent molar amount of another polydiorganosiloxane, with the balance being polycarbonate. In a particular embodiment, the copolymer may comprise about 20 wt % siloxane.

In specific embodiments, the polycarbonate polymer is derived from a dihydroxy compound having the structure of the Formula:

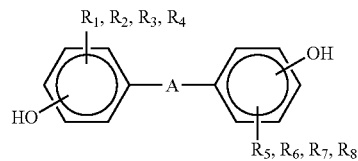

wherein $R_1$ through $R_8$ are each independently selected from hydrogen, halogen, nitro, cyano, $C_{1-20}$ alkyl, $C_{4-20}$ cycloalkyl, and $C_{6-20}$ aryl; and A is selected from a bond, —O—, —S—, —SO$_2$, $C_{1-12}$ alkyl, $C_{6-20}$ aromatic, and $C_{6-20}$ cycloaliphatic.

In specific embodiments, the dihydroxy compound of Formula (I) is 2,2-bis(4-hydroxyphenyl)propane (i.e. bisphenol-A or BPA). Other illustrative compounds of Formula (I) include: 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl)cyclohexane; 4,4' dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

The polyorganosiloxane-polycarbonate can comprise 50 to 99 wt. % of carbonate units and 1 to 50 wt. % siloxane units. Within this range, the polyorganosiloxane-polycarbonate copolymer can comprise 70 to 98 wt. %, more specifically 75 to 97 wt. % of carbonate units and 2 to 30 wt. %, more specifically 3 to 25 wt. % siloxane units.

Polyorganosiloxane-polycarbonates can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polyorganosiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polyorganosiloxane-polycarbonates of different flow properties can be used to achieve the overall desired flow property.

In one embodiment, Polycarbonate B is Polycarbonate-Polydimethylsiloxane copolymer containing approximately 18 to 20 percent siloxane. The polycarbonate-polysiloxane copolymer has a weight average molecular weight of 28,000 to 32,000.

Specifically, the polycarbonate-siloxane block copolymer can have the following formula:

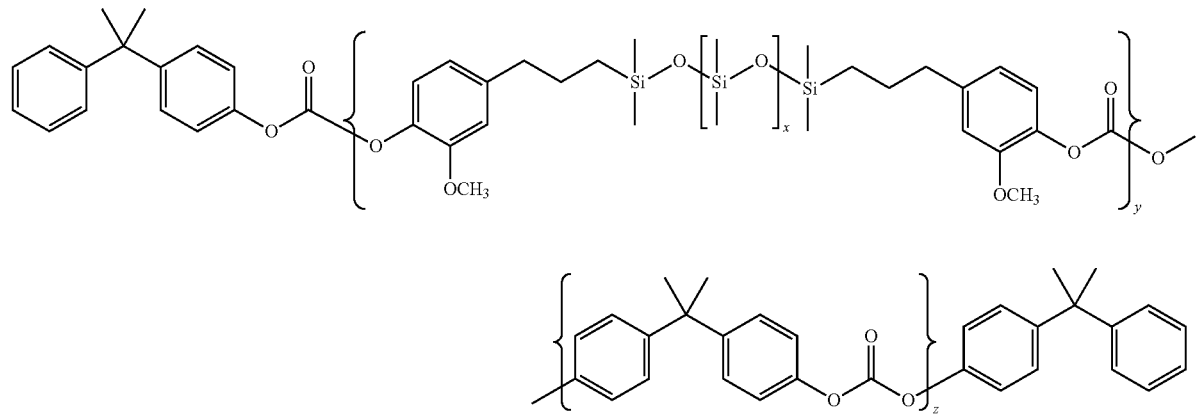

wherein x is 30-50, specifically about 40, y is 10-30, specifically about 20, and z is 45-60, specifically about 50 or 55.

In one embodiment, the composition comprises about 10 to about 60 percent by weight of Polycarbonate B. In another embodiment, the composition comprises 15 to about 55 percent by weight of Polycarbonate B. In another embodiment, the composition comprises 20 to about 50 percent by weight of Polycarbonate B. In another embodiment, the composition comprises 22 to about 48 percent by weight of Polycarbonate B. In another embodiment, the composition comprises 25 to 45 percent by weight of Polycarbonate B. In another embodiment, the composition comprises 20 to 30 percent by weight of Polycarbonate B. In another embodiment, the composition comprises 25 to 35 percent by weight of Polycarbonate B. In another embodiment, the composition comprises 30 to 40 percent by weight of Polycarbonate B. In these and other embodiments, Polycarbonate B can be any of the polycarbonates described in this section. More particularly, Polycarbonate B is a polycarbonate/polydimethylsiloxane copolymer.

Flame Retardant

In addition to the polyester and polycarbonate components, the compositions contain a non-halogenated flame retardant. The non-halogenated flame retardants that are used in the compositions can be in the form of additive or reactive materials.

Additive type flame-retardants include aluminum trihydrate, magnesium hydroxide, zinc borate (used in conjunction with either alumina trihydrate or magnesium hydroxide), ammonium pentaborate, or phosphorus containing materials such as ammonium polyphosphate, melamine polyphosphate, melamine salt of pentaerythritol acid phosphate, dimethylmethylphosphonate, aluminum diethylphosphinate, and phosphate esters (triphenyl phosphate, triaryl phosphate (e.g., trpiphenyl phosphate (TPP), triethyl phosphate, dimethyl methylphosphonate, and resorcinol bis(diphenyl phosphate) (RDP)).

Reactive type flame-retardants include polyols which contain phosphorus groups. 10-(2,5-dihydroxyphenyl)-10H-9-oxa-10-phospha-phenanthrene-10-oxide, phosphorus-containing lactone-modified polyesters, ethylene glycol bis (diphenyl phosphate), neopentylglycol bis(diphenyl phosphate), amine- and hydroxyl-functionalized siloxane oligomers. These flame retardants can be used alone or in conjunction with other flame retardants.

In one embodiment, the non-halogenated flame retardant is a phosphorus-containing flame retardant. The phosphorous-containing flame retardant may be an inorganic or organic phosphate and/or an organic compound containing phosphorus-nitrogen bonds.

One type of exemplary organic phosphate is an aromatic phosphate of the formula $(GO)_3P{=}O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl) p-tolyl phosphate, tritolyl phosphate, bis(2-ethylhexyl)phenyl phosphate, tri(nonylphenyl)phosphate, bis (dodecyl) p-tolyl phosphate, dibutyl phenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, phosphate compounds of the formulas below:

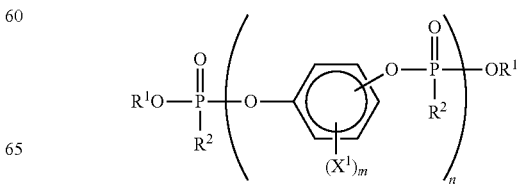

-continued

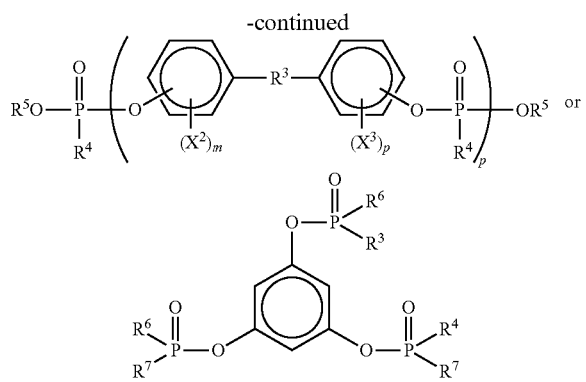

wherein each $G^1$ is independently a hydrocarbon having 1 to about 30 carbon atoms; each G2 is independently a hydrocarbon or hydrocarbonoxy having 1 to about 30 carbon atoms; each X is hydrogen; m 0 to 4, and n is 1 to about 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A (BPADP), respectively, their oligomeric and polymeric counterparts, and the like. Methods for the preparation of the aforementioned di- or polyfunctional aromatic compounds are described in British Patent No. 2,043,083.

In some embodiments, the flame retardant comprises one or more metal salts of phosphinates and phosphonates (so-called "metallophosphorous" flame retardants). The metal component of the metal phosphinate or phosphonate salt can be a cation of Mg, Ca, Al, Sb, Sn, Ge, Ti, Zn, Fe, Zr, Ce, Bi, Sr, Mn, Li, Na, or K. The phosphinate or phosphonate component can be dimethylphosphinate, diethylphosphinate, di-n-propylphosphinate, di-n-butylphosphinate, di-n-hexylphosphinate, dicyclohexylphosphinate, di-2-ethylhexylphosphinate, diphenylphosphinate, di-o-tolylphosphinate, dimethylphosphonate, diethylphosphonate, di-n-propylphosphonate, di-n-butylphosphonate, di-n-hexylphosphonate, dicyclohexylphosphonate, di-2-ethylhexylphoshate, diphenylphosphonate, di-o-tolylphosphonate, dimethylphosphate, diethylphosphate, di-n-propylphosphate, di-n-butylphosphate, di-n-hexylphosphate, dicyclohexylphosphate, di-2-ethylhexylphoshate, diphenylphosphate, di-o-tolylphosphate, and the like, and mixtures thereof. A preferred metallophosphorus flame retardant is aluminum tris(diethylphosphinate). Preparation of metallophosphorus flame retardants is described, for example, in U.S. Pat. Nos. 6,255,371 and 6,547,992 to Schlosser et al., and U.S. Pat. Nos. 6,355,832 and 6,534,673 to Weferling et al.

Desirably, the phosphorous-containing flame retardant does not contain any halogens.

In one embodiment, the composition comprises about 4 to 7 percent by weight of the non-halogenated flame retardant when the non-halogenated flame retardant is an organophosphate, organophosphonate, or organophosphinate. In another embodiment, the composition comprises about 4 to 7 percent by weight of the non-halogenated flame retardant when the non-halogenated flame retardant BPADP.

In another embodiment, the composition comprises 4 to about 10 percent by weight of the non-halogenated flame retardant when the non-halogenated flame retardant is other than when the non-halogenated flame retardant is an organophosphate, organophosphonate, or organophosphinate.

Thus, in another embodiment, the non-halogenated flame retardant Polyphosphonate, from FRX Polymers, having the trade name Nofia™ HM1100. In another embodiment, the non-halogenated flame retardant is Phosphazene, CAS Reg. No. 260408-02-4, from Otsuka, having the trade name SPB 100. In another embodiment, the non-halogenated flame retardant is Solid Phosphonate ester, from ICL-IP, having the trade name Fyrolflex Sol-DP Other Components The thermoplastic composition may also include various additives such as fillers, reinforcing agents, stabilizers, and the like, with the proviso that the additives do not adversely affect the desired properties of the thermoplastic compositions. Mixtures of additives may be used. Such additives may be mixed at a suitable time during the mixing of the components for forming the composition.

Examples of suitable fillers or reinforcing agents include any materials known for these uses. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc; wollastonite; surface-treated wollastonite; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber through for example, co-weaving or core/sheath, side-by-side, orange-type or matrix and fibril constructions, or by other methods known to one skilled in the art of fiber manufacture. Suitable co-woven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about zero to about 50 parts by weight, optionally about 1 to about 20 parts by weight, and in some embodiments, about 4 to about 15 parts by weight, based on 100 parts by weight of the polymer components (A), (B), (C), and (D).

The thermoplastic composition may comprise a primary antioxidant or "stabilizer" (e.g., a hindered phenol and/or secondary aryl amine) and, optionally, a secondary antioxidant (e.g., a phosphite and/or thioether). Suitable antioxidant additives include, for example, organophosphites such as tris (nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight of the polymer components as described above.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of the polymer components described above.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of the polymer components described above.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy] methyl]propane (UVINUL™ 3030); 2,2'-(1,4-phenylene)bis (4H-3,1-benzoxazin-4-one); 1,3-bis[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of the polymer components described above.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.1 to about 20 parts by weight, optionally about 1 to about 10 parts by weight, based on 100 parts by weight of the polymer components described above.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide (polyetheramide) block copolymers, polyetheresteramide block copolymers, polyetheresters, or polyurethanes, each containing polyalkylene glycol moieties such as polyethylene glycol, polypropylene glycol, polytetramethylene glycol, and the like. Such polymeric antistatic agents are commercially available, such as, for example, Pelestat™ 6321 (Sanyo), Pebax™. MH1657 (Atofina), and Irgastat™ P18 and P22 (Ciba-Geigy). Other polymeric materials that may be used as antistatic agents are inherently conducting polymers such as polyaniline (commercially available as PANIPOL® from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 10 parts by weight, based on 100 parts by weight of the polymer components described above.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of the polymer components described above.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3",5"-tetra t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes.

Dyes are generally used in amounts of about 0.1 to about 10 ppm, based on 100 parts by weight of the polymer components described above.

Composition

In one aspect, the invention is directed to a composition comprising:
 (a) 10 to 50 percent by weight of a polyethylene terephthalate
 (b) 20 to 70 percent by weight of Polycarbonate A which is a copolycarbonate of 2-phenyl-3,3-bis(4-hydroxyphenyl)phthalimidine (PPPBP) and another bisphenol;
 (c) 10 to 60 percent by weight of Polycarbonate B, which is a polycarbonate-polysiloxane copolymer; and
 (d) 4 to 10 percent by weight of a non-halogenated flame retardant provided that when the non-halogenated flame retardant is an organophosphate, organophosphonate, or organophosphinate, the weight percent is 4 to 7 percent by weight; wherein:
 the weight percents are based on the total weight of the composition and the composition passes the following tests:
  (i) the Ball Pressure Test according to (IEC) DIN EN 60695-10-2, VDE 0471 Part 10-2 or (IEC) DIN EN 60335-1 at 125° C.; or
  (ii) the Glow Wire Flammability Test (IEC) 60695-2-12 at 850° C.; and
  (iii) has a UL94 Vertical Flame Rating, V-0 at 1.5 mm.

In one embodiment of this aspect, the composition comprises 4 to 7 percent by weight of a non-halogenated flame retardant.

In another embodiment, the composition comprises:
 (a) 14 to 30 percent by weight of a polyester;
 (b) 30 to 60 percent by weight of Polycarbonate A;
 (c) 20 to 50 percent by weight of Polycarbonate B; and
 (d) 4 to 7 percent by weight of a non-halogenated flame retardant In another embodiment, the composition comprises:
 (a) 15 to 28 percent by weight of a polyester;
 (b) 32 to 68 percent by weight of Polycarbonate A;
 (c) 22 to 48 percent by weight of Polycarbonate B; and
 (d) 4 to 7 percent by weight of an organophosphate, organophosphonate, or organophosphinate non-halogenated flame retardant.

In another embodiment, the composition comprises:
 (a) 15 to 28 percent by weight of a polyester;
 (b) 32 to 68 percent by weight of Polycarbonate A;
 (c) 22 to 48 percent by weight of Polycarbonate B; and
 (d) 4 to 7 percent by weight of BPADP.

In another embodiment, the composition comprises:
 (a) 15 to 28 percent by weight of a polyester;
 (b) 32 to 68 percent by weight of Polycarbonate A;
 (c) 22 to 48 percent by weight of Polycarbonate B; and
 (d) 4 to 7 percent by weight of a non-halogenated flame retardant selected from the group consisting of Polyphosphonate, Phosphazene, and Solid Phosphonate ester.

In another embodiment, the composition comprises:
 (a) 15 to 28 percent by weight of a polyester;
 (b) 32 to 68 percent by weight of Polycarbonate A;
 (c) 22 to 40 percent by weight of Polycarbonate B; and
 (d) 4 to 7 percent by weight of a non-halogenated flame retardant selected from the group consisting of BDADP, Polyphosphonate, Phosphazene, and Solid Phosphonate ester.

In another embodiment, the composition comprises:
 (a) 15 to 28 percent by weight of a polyester;
 (b) 32 to 68 percent by weight of Polycarbonate A;
 (c) 22 to 40 percent by weight of Polycarbonate B; and (d) 4 to 7 percent by weight of a non-halogenated flame retardant selected from the group consisting of Polyphosphonate, from FRX Polymers, having the tradename Nofia™ HM1100, Phosphazene, having the tradename SPB100, and Solid Phosphonate ester having the tradename Fyrolflex Sol-DP.

In these and other embodiments, the polyester is PET or PBT.

In these and other embodiments, Polycarbonate A is a copolymer of PPPBP and bisphenol-A.

In these and other embodiments, Polycarbonate B is a polycarbonate/polydimethylsiloxane (PC/PDMS) copolymer.

In another embodiment, the composition comprises:
(a) 10 to 50 percent by weight of a polyester;
(b) 20 to 70 percent by weight of Polycarbonate A which is a copolymer of 2-phenyl-3,3-bis(4-hydroxyphenyl)phthalimidine (PPPBP) and another monomer;
(c) 20 to 50 percent by weight of Polycarbonate B, which is a polycarbonate-polysiloxane copolymer; and
(d) 4 to 10 percent by weight of a non-halogenated flame retardant provided that the non-halogenated flame retardant is not an organophosphate, organophosphonate, or organophosphinate flame retardant; wherein:
the weight percents are based on the total weight of the composition and the composition passes the following tests:
(i) the Ball Pressure Test according to (IEC) DIN EN 60695-10-2, VDE 0471 Part 10-2 or (IEC) DIN EN 60335-1 at 125° C.; or
(ii) the Glow Wire Flammability Test (IEC) 60695-2-12 at 850° C.; and
(iii) has a UL94 Vertical Flame Rating, V-0 at 1.5 mm.

In another embodiment, the composition comprises:
(a) 14 to 30 percent by weight of a polyester;
(b) 30 to 60 percent by weight of Polycarbonate A; and
(c) 20 to 50 percent by weight of Polycarbonate B.

In another embodiment, the composition comprises:
(a) 15 to 28 percent by weight of a polyester;
(b) 32 to 68 percent by weight of Polycarbonate A;
(c) 22 to 48 percent by weight of Polycarbonate B; and
(d) 4 to 10 percent by weight of a non-halogenated flame retardant selected from the group consisting of Polyphosphonate, Phosphazene, and Solid Phosphonate ester.

In another embodiment, the composition comprises:
(a) 15 to 28 percent by weight of a polyester;
(b) 32 to 68 percent by weight of Polycarbonate A;
(c) 22 to 40 percent by weight of Polycarbonate B; and
(d) 4 to 10 percent by weight of a non-halogenated flame retardant selected from the group consisting of Polyphosphonate, from FRX Polymers, having the tradename Nofia™ HM1100, Phosphazene, having the tradename SPB100, and Solid Phosphonate ester having the tradename Fyrolflex Sol-DP.

In these and other embodiments, the polyester is PET or PBT.

In these and other embodiments, Polycarbonate A is a copolymer of PPPBP and bisphenol-A.

In these and other embodiments, Polycarbonate B is a polycarbonate/polydimethylsiloxane (PC/PDMS) copolymer.

In another embodiment, the composition comprises:
(a) 15 to 28 percent by weight of PET or PBT;
(b) 32 to 68 percent by weight of Polycarbonate A which is a copolymer of PPPBP and bisphenol-A;
(c) 22 to 48 percent by weight of Polycarbonate B which is a polycarbonate/polydimethylsiloxane (PC/PDMS) copolymer; and
(d) 4 to 7 percent by weight of organophosphate, organophosphonate, or organophosphinate non-halogenated flame retardant.

In another embodiment, the composition comprises:
(a) 15 to 28 percent by weight of PET;
(b) 32 to 68 percent by weight of Polycarbonate A which is a copolymer of PPPBP and bisphenol-A;
(c) 22 to 48 percent by weight of Polycarbonate B which is a polycarbonate/polydimethylsiloxane (PC/PDMS) copolymer; and
(d) 4 to 7 percent by weight of BPADP.

In another embodiment, the composition comprises:
(a) 15 to 28 percent by weight of PET;
(b) 45 to 55 percent by weight of Polycarbonate A which is a copolymer of PPPBP and bisphenol-A;
(c) 22 to 40 percent by weight of Polycarbonate B which is a polycarbonate/polydimethylsiloxane (PC/PDMS) copolymer; and
(d) 4 to 7 percent by weight of BPADP.

In another embodiment, the composition comprises:
(a) 15 to 28 percent by weight of PET;
(b) 35 to 45 percent by weight of Polycarbonate A which is a copolymer of PPPBP and bisphenol-A;
(c) 22 to 40 percent by weight of Polycarbonate B which is a polycarbonate/polydimethylsiloxane (PC/PDMS) copolymer; and
(d) 4 to 7 percent by weight of BPADP.

In another embodiment, the composition comprises:
(a) 15 to 28 percent by weight of PET or PBT;
(b) 32 to 68 percent by weight of Polycarbonate A which is a copolymer of PPPBP and bisphenol-A;
(c) 22 to 48 percent by weight of Polycarbonate B which is a polycarbonate/polydimethylsiloxane (PC/PDMS) copolymer; and
(d) 4 to 10 percent by weight of a non-halogenated flame retardant provided that the non-halogenated flame retardant is not an organophosphate, organophosphonate, or organophosphinate flame retardant.

In another embodiment, the composition comprises:
(a) 15 to 28 percent by weight of PET or PBT;
(b) 32 to 68 percent by weight of Polycarbonate A which is a copolymer of PPPBP and bisphenol-A;
(c) 22 to 48 percent by weight of Polycarbonate B which is a polycarbonate/polydimethylsiloxane (PC/PDMS) copolymer; and
(d) 4 to 10 percent by weight of a non-halogenated flame retardant provided that the non-halogenated flame retardant is not an organophosphate, organophosphonate, or organophosphinate flame retardant.

In another embodiment, the composition comprises:
(a) 15 to 28 percent by weight of PET;
(b) 45 to 55 percent by weight of Polycarbonate A which is a copolymer of PPPBP and bisphenol-A;
(c) 22 to 40 percent by weight of Polycarbonate B which is a polycarbonate/polydimethylsiloxane (PC/PDMS) copolymer; and
(d) 4 to 10 percent by weight of non-halogenated flame retardant which is selected from the group consisting of Polyphosphonate, Phosphazene, and Solid Phosphonate.

In another embodiment, the composition comprises:
(a) 15 to 28 percent by weight of PET;
(b) 45 to 45 percent by weight of Polycarbonate A which is a copolymer of PPPBP and bisphenol-A;
(c) 22 to 40 percent by weight of Polycarbonate B which is a polycarbonate/polydimethylsiloxane (PC/PDMS) copolymer; and (d) 4 to 10 percent by weight of non-halogenated flame retardant which is not BPADP and is selected from the group consisting of Polyphosphonate, from FRX Polymers, having the tradename Nofia™ HM1100, Phosphazene, having the tradename SPB100, and Solid Phosphonate ester having the tradename Fyrolflex Sol-DP.

In a particular embodiment, the non-halogenated flame retardant is Polyphosphonate. Polyphosphnate is available from FRX Polymers, and has the tradename Nofia™ HM 1100.

In another particular embodiment, the non-halogenated flame retardant is Phosphazene. Phosphazene is available from Otsuka, and has the tradename SPB 100.

In another particular embodiment, the non-halogenated flame retardant is Solid Phosphonate ester. Solid Phosphonate ester is available from ICL-IP, and has the tradename Fyrolflex Sol-DP.

Process

In another aspect, the invention also provides a process for preparing the compositions, comprising compounding the components on a co-rotating twin screw extruder with 25 mm diameter screws. The barrel temperature range is approximately 240 to 280° C. with a screw speed of 200-300 rpm.

Article

In another aspect, the invention is directed to an articles prepared from the composition described herein. Such articles include plug and wire coverings for electrical equipment; for example, for electrical units that are used to recharge electric vehicles.

Additional Embodiments

The invention includes the following embodiments.

Embodiment 1

A composition comprising:
(a) 10 to 50 percent by weight of a polyethylene terephthalate
(b) 20 to 70 percent by weight of Polycarbonate A which is a copolycarbonate of 2-phenyl-3,3-bis(4-hydroxyphenyl)phthalimidine (PPPBP) and another bisphenol;
(c) 10 to 60 percent by weight of Polycarbonate B, which is a polycarbonate-polysiloxane copolymer; and
(d) 4 to 10 percent by weight of a non-halogenated flame retardant provided that when the non-halogenated flame retardant is an organophosphate, organophosphonate, or organophosphinate, the weight percent is 4 to 7 percent by weight; wherein:
the weight percents are based on the total weight of the composition and the composition passes the following tests:
(i) the Ball Pressure Test according to (IEC) DIN EN 60695-10$^{-2}$, VDE 0471 Part 10-2 or (IEC) DIN EN 60335-1 at 125° C.; or
(ii) the Glow Wire Flammability Test (IEC) 60695-2-12 at 850° C.; and
(iii) has a UL94 Vertical Flame Rating, V-0 at 1.5 mm.

Embodiment 2

The composition of Embodiment 1, comprising:
(a) 14 to 30 percent by weight of a polyester;
(b) 30 to 60 percent by weight of Polycarbonate A; and
(c) 20 to 50 percent by weight of Polycarbonate B.

Embodiment 3

The composition of Embodiments 1 or 2, comprising:
(a) 15 to 28 percent by weight of a polyester;
(b) 32 to 68 percent by weight of Polycarbonate A; and
(c) 22 to 48 percent by weight of Polycarbonate B.

Embodiment 4

The composition of any of Embodiments 1 to 3, comprising:
(a) 15 to 28 percent by weight of a polyester;
(b) 32 to 68 percent by weight of Polycarbonate A; and
(c) 22 to 40 percent by weight of Polycarbonate B.

Embodiment 5

The composition of any of Embodiments 1 to 4, wherein
(a) the polyester is PET or PBT;
(b) Polycarbonate A is a copolymer of PPPBP and bisphenol-A;
(c) Polycarbonate B is a polycarbonate/polydimethylsiloxane (PC/PDMS) copolymer.
(d) the non-halogenated flame retardant is selected from the group consisting of bisphenol-A bis(diphenylphosphate (BPADP), Polyphosphonate, Phosphazene, and Solid Phosphonate ester.

Embodiment 6

The composition of Embodiment 5, comprising 4 to 7 percent by weight of a non-halogenated flame retardant.

Embodiment 7

The composition of Embodiment 5, comprising 4 to 10 percent by weight of a non-halogenated flame retardant provided that the non-halogenated flame retardant is not an organophosphate, organophosphonate, or organophosphinate flame retardant.

Embodiment 8

The composition of Embodiment 6, wherein the non-halogenated flame retardant is selected from the group consisting of Polyphosphonate, Phosphazene, and Solid Phosphonate ester.

Embodiment 9

A composition comprising:
(a) 15 to 28 percent by weight of PET or PBT;
(b) 32 to 68 percent by weight of Polycarbonate A which is a copolymer of PPPBP and bisphenol-A;
(c) 22 to 48 percent by weight of Polycarbonate B which is a polycarbonate/polydimethylsiloxane (PC/PDMS) copolymer; and
(d) 4 to 7 percent by weight of organophosphate, organophosphonate, or organophosphinate non-halogenated flame retardant.

Embodiment 10

The composition of Embodiment 9, comprising 4 to 7 percent by weight of BPADP.

Embodiment 11

A composition comprising:
(a) 15 to 28 percent by weight of PET or PBT;
(b) 32 to 68 percent by weight of Polycarbonate A which is a copolymer of PPPBP and bisphenol-A;
(c) 22 to 48 percent by weight of Polycarbonate B which is a polycarbonate/polydimethylsiloxane (PC/PDMS) copolymer; and
(d) 4 to 10 percent by weight of a non-halogenated flame retardant provided that the non-halogenated flame retardant is not an organophosphate, organophosphonate, or organophosphinate flame retardant.

Embodiment 12

The composition of Embodiment 11, comprising 4 to 10 percent by weight of non-halogenated flame retardant which is selected from the group consisting of Polyphosphonate, Phosphazene, and Solid Phosphonate.

Embodiment 13

A process for preparing the any of the compositions of Embodiments 1-12, comprising compounding the components on a co-rotating twin screw extruder with 25 mm diameter screws.

Embodiment 14

The process of Embodiment 12, wherein the barrel temperature range is approximately 240 to 280° C. with a screw speed of 200-300 rpm.

Embodiment 15

An article prepared from the composition of any of Embodiments 1-12.

Embodiment 16

The article of Embodiment 15 which is a plug coating or wire covering.

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

EXAMPLES

The examples of the compositions of the present invention, annotated hereinafter as "EX." and their comparative examples, annotated hereinafter as "CE", employed the materials listed in Table 1. All weight percents employed in the examples are based on the weight percent of the entire composition except where stated otherwise.

TABLE 1

| Component | Trade Name and Supplier |
|---|---|
| Polyester A | Polyethylene terephthalate, CAS Reg. No. 25038-59-9 from Indorama having the tradename RamaPET N180, with an intrinsic viscosity (IV) of 0.80-0.82 dl/g |
| Polyester B | Polybutyleneterephthalate, CAS Reg. No. 26062-94-2, from Chang Chun, having the tradename PBT1100X |
| Bisphenol A Polycarbonate | Bisphenol A(BPA) Polycarbonate, CAS Reg. No, 25971-63-5, from SABIC Innovative Plastics having the tradename PC105, with an IV 57-60 ml/g and a molecular weight (Mw) of 30000-31000 |
| Polycarbonate A | 2-phenyl-3,3-bis(4-hydroxyphenyl)phthalimidine (PPPBP)/BPA copolycarbonate, CAS Reg. No. 503834-43-3, from SABIC Innovative Plastics, with a Mw of approximately 24000-26000 and a percent PPPBP of 30-34 percent |
| Polycarbonate B | Polycarbonate/Polydimethyl siloxane (PC/PDMS) copolymer, Reg. No. CAS202483-49-6, from SABIC Innovative Plastics, having the tradename Lexan EXL, with 18-22 percent siloxane and a Mw of approximately 28000-32000 |
| Impact Modifier | Methylmethacrylate Butadiene shell-core copolymer (MBS), CAS Reg. No. "trade secret", from Rohm&Haas/Dow, having the tradename Paraloid EXL2650A |
| Flame Retardant 1 | Bisphenol A-Diphenyl Phosphate (BPADP) CAS Reg. No. 5945-33-5, from Chemtura, having the tradename Reofos BAPP. 8.9 percent phosphorus by weight |
| Flame Retardant 2 | Polyphosphonate, Cas Reg.No. "trade secret", from FRX Polymers, having the tradename Nofia ™ HM1100. 10.5 percent phosphorus by weight |
| Flame Retardant 3 | Phosphazene, CAS Reg. No. 260408-02-4, from Otsuka, having the tradename SPB100. 13.4 percent phosphorus by weight. |
| Flame Retardant 4 | Solid Phosphonate ester, CAS Reg. No. "trade secret", from ICL-IP, having the tradename Fyrolflex Sol-DP. 10.5 percent phosphorus by weight. |
| Flame Retardant 5 | Brominated polycarbonate copolymer of BPA and TBBPA, CAS Reg. Nr. 156042-31-8, from SABIC-Innovative Plastics, having the tradename PC105B |
| Flame Retardant 6 | AntimonyTrioxide, CAS Reg. Nr. 1309-64-4, from Campine, having the tradename Sb2O3/PBT MB 80/20 |
| Antioxidant 1 | Pentaerythritol Tetrakis (3-(3,5-di-tert-butyl-4-hydroxyphenyl) Propionate CAS Reg. No. 6683-19-8, (Antioxidant 1010) from Everspring |
| Antioxidant 2 | Pentaerythritol Tetrakis(3-laurylthiopropionate), CAS Reg. Nr. 29598-76-3, from Clariant, having the tradename Seenox 412S |
| Release Agent 1 | Paraffin-hydrocarbon mixture, CAS Reg. Nr. 8002-74-2, from SASOL WAX GmbH, having the tradename Sasolwax 3283 |
| Release Agent 2 | Poly(ethylene), low density, CAS Reg. Nr. 9002-88-4, from Polymeri, Stamylan LD1922T |
| Flow Promoter | Ethylene Vinyl Acatate copolymer, CAS reg. Nr. 24937-78-8, from Distrupol BV, having the tradename Greenflex ML30 |

TABLE 1-continued

| Component | Trade Name and Supplier |
|---|---|
| Antidrip Agent | Encapuslated Polytetrafluoroethylene, CAS Reg. No. 9002-84-0, from Sabic Innovative Plastics, having the tradename TSAN, with 47-53 weight percent PTFE |
| UV Stabilizer | 2-(2-Hydroxy-5-tert-octylphenyl) benzotriazole (UVA 5411), CAS Reg. No. 3147-75-9, from Cytec, having the tradename Cyasorb UV5411 |
| Filler | Fine Talc CAS Reg. No. 14807-96-6 having the tradename Luzenac JETFINE 3CA from Luzenac Naintisch GmbH |
| Quencher | $Zn_3(PO_4)_2 \cdot 2H_2O$ CAS Reg. No. 13598-37-3, from Budenheim, having the tradename Z21-82 |

Method

The compositions, comparative examples, and ASTM testing specimens were prepared as provided below.

Compounding: The compositions were compounded on WP25, a co-rotating twin screw extruder, with 25 mm diameter screws. Barrel temperature range of ±240-280° C., Screw Speed 200-300 rpm.

Molding: The compositions were prepared by injection molding on an ENGEL injection molding machine. Barrel temperature range of ±240-280° C., Tool Temperature range ±60-100° C.; Predrying: 2-4 hrs @ 80-100° C.

Testing

The tests used to characterize the compositions of the present invention, and the comparative examples, are summarized below in Table 2.

TABLE 2

| Test | Description |
|---|---|
| BPT | Ball Pressure Test (IEC) DIN EN 60695-10-2, VDE 0471 Part 10-2 or (IEC) DIN EN 60335-1 at 125° C. Passing = indentation of 2 mm or less |
| GWFT | Glow Wire Flammability Test (IEC) 60695-2-12 at 850° C. Passing = flame out times of 30 seconds or less |
| UL94 V-O | UL Vertical Flame Rating, V-0 at 1.5 mm; Passing = flameout times of 10 seconds or less |

Results

Tables 3A and 3B summarize the composition and testing properties of the Comparative Examples CEX1-CEX8. Tables 4A and 4B summarize the composition and testing properties of Examples 1-6 (EX1-EX6). The data suggest that the presence of Polycarbonate A in the formulations ensures the performance of the formulations with respect to the UL94, GWFT, and BPT (CEX1-4 versus EX1-6). CEX1, which contained a brominated polycarbonate and antimony trioxide as the flame retardant, did not pass UL94. In CEX2-8 and EX1-6, BPADP replaced brominated polycarbonate and antimony trioxide as the flame retardant.

In samples containing Polycarbonate A, the ratio of total polycarbonate to total polyester is also important. In order to pass UL94, GWFT, and BPT, the ratio of total polycarbonate in samples containing Polycarbonate A to total polyester needs to be at least about 3:1, and up to about 6:1 (CEX5-8 versus EX1-6). The ratio amount of polyester in the formulations also appears to be important. Formulations that have less than 25 weight percent of polyester meet the performance requirements (EX1-6), while formulations with more than 20 weight percent polyester do not (CEX5-8). When PET is used instead of PBT, it is possible to minimize the quantity of BPADP that is needed so that the material passes the BPT but possesses enough flame retardancy to meet the UL94 V0 rating (CEX1, 2, and 4 versus EX1-6). In other words, BPADP levels that are greater than about 7.5 weight percent will lead to BPT failure.

TABLE 3A

Composition of Comparative Examples 1-8

| Component | CEX 1 | CEX 2 | CEX 3 | CEX 4 | CEX 5 | CEX 6 | CEX 7 | CEX 8 |
|---|---|---|---|---|---|---|---|---|
| Polyester A | — | — | 17.15 | — | 27.15 | 27.15 | 25 | 25 |
| Polyester B | 33.79 | 16.93 | — | 20 | — | — | — | — |
| BPA-PC | 34.2 | 38.2 | 40 | 45.13 | 15 | — | — | — |
| Polycarbonate A | — | — | — | — | 15 | 30 | 42.15 | 41.15 |
| Polycarbonate B | — | 35 | 35 | 25 | 35 | 35 | 25 | 25 |
| Flame Retardant 1 | — | 8.5 | 4.5 | 8.5 | 4.5 | 4.5 | 4.5 | 5.5 |
| Flame Retardant 5 | 14.5 | — | — | — | — | — | — | — |
| Flame Retardant 6 | 4.3 | — | — | — | — | — | — | — |
| Impact Modifier | 10 | — | — | — | — | — | — | — |
| Encapsulated PTFE | — | 0.8 | 0.8 | 0.8 | 0.8 | 0.8 | 0.8 | 0.8 |
| Release Agent 1 | 1 | — | — | — | — | — | — | — |
| Release Agent 2 | 1 | — | — | — | — | — | — | — |
| Flow Promoter | 0.6 | — | — | — | — | — | — | — |
| Oxidant 1 | 0.06 | 0.15 | 0.15 | 0.15 | 0.15 | 0.15 | 0.15 | 0.15 |
| Oxidant 2 | 0.1 | — | — | — | — | — | — | — |
| UV Stabilizer | 0.25 | 0.27 | 0.25 | 0.27 | 0.25 | 0.25 | 0.25 | 0.25 |
| Filler | — | — | 2 | — | 2 | 2 | 2 | 2 |
| Quencher | 0.2 | 0.15 | 0.15 | 0.15 | 0.15 | 0.15 | 0.15 | 0.15 |
| Resin Ratios | | | | | | | | |
| Polycarbonate:Polyester | 1.0 | 4.3 | 4.4 | 3.5 | 2.4 | 2.4 | 2.7 | 2.6 |
| BPA-PC:Polycarbonate A | — | — | — | — | 1.0 | 0.0 | 0.0 | 0.0 |

TABLE 3A-continued

Composition of Comparative Examples 1-8

| Component | CEX 1 | CEX 2 | CEX 3 | CEX 4 | CEX 5 | CEX 6 | CEX 7 | CEX 8 |
|---|---|---|---|---|---|---|---|---|
| Polycarbonate A: Polycarbonate B | — | 0.0 | 0.0 | 0.0 | 0.4 | 0.9 | 1.7 | 1.6 |

TABLE 3B

Properties of Comparative Examples 1-8

| Component | CEX 1 | CEX 2 | CEX 3 | CEX 4 | CEX 5 | CEX 6 | CEX 7 | CEX 8 |
|---|---|---|---|---|---|---|---|---|
| Impact kJ/m$^2$ | 50 | 34 | 57 | 16 | 9 | 11 | 9 | 8 |
| UL94 V-0 | FAIL | PASS | PASS | PASS | FAIL | FAIL | FAIL | FAIL |
| GWFT @ 2 mm | PASS | PASS | PASS | PASS | FAIL | PASS | PASS | PASS |
| BPT | PASS | FAIL | FAIL | FAIL | FAIL | PASS | PASS | PASS |

TABLE 4A

Composition of Examples 1-6

| | EX 1 | EX 2 | EX 3 | EX 4 | EX 5 | EX 6 |
|---|---|---|---|---|---|---|
| Polyester A | 15 | 15 | 20 | 15 | 15 | 20 |
| Polyester B | — | — | — | — | — | — |
| BPA-PC | — | — | — | — | — | — |
| Polycarbonate A | 52.15 | 51.15 | 41.65 | 42.15 | 42 | 41.65 |
| Polycarbonate B | 25 | 25 | 30 | 35 | 35 | 30 |
| Flame Retardant 1 | 4.5 | 5.5 | 5.0 | 4.5 | 5.5 | 5.0 |
| Flame Retardant 5 | — | — | — | — | — | — |
| Flame retardant 6 | — | — | — | — | — | — |
| Impact Modifier | — | — | — | — | — | — |
| Encapsulated PTFE | 0.8 | 0.8 | 0.8 | 0.8 | 0.8 | 0.8 |
| Release Agent 1 | — | — | — | — | — | — |
| Release Agent 2 | — | — | — | — | — | — |
| Flow Promoter | — | — | — | — | — | — |
| Oxidant 1 | 0.15 | 0.15 | 0.15 | 0.15 | 0.15 | 0.15 |
| Oxidant 2 | — | — | — | — | — | — |
| UV Stabilizer | 0.25 | 0.25 | 0.25 | 0.25 | 0.25 | 0.25 |
| Filler | 2 | 2 | 2 | 2 | 2 | 2 |
| Quencher | 0.15 | 0.15 | 0.15 | 0.15 | 0.15 | 0.15 |
| Resin Ratios | | | | | | |
| Polycarbonate: Polyester | 5.1 | 5.1 | 3.6 | 5.1 | 5.1 | 3.6 |
| BPA-PC: Polycarbonate A | 0.0 | 0.0 | 0.0 | 0.0 | 0.0 | 0.0 |
| Polycarbonate A: Polycarbonate B | 2.1 | 2.0 | 1.4 | 1.2 | 1.2 | 1.4 |

TABLE 4B

Testing Properties of Examples 1-6

| | EX 1 | EX 2 | EX 3 | EX 4 | EX 5 | EX 6 |
|---|---|---|---|---|---|---|
| Impact kJ/m$^2$ | 13 | 12 | 13 | 18 | 18 | — |
| UL94 V-0 | PASS | PASS | PASS | PASS | PASS | Pass |
| GWFT @ 2 mm | PASS | PASS | PASS | PASS | PASS | Pass |
| BPT | PASS | PASS | PASS | PASS | PASS | Pass |

Using Other Non-Halogenated Flame Retardants

The use of other halogen-free flame retardants was also investigated in comparison to BPADP (Flame Retardant 1). The halogen-free flame retardants that were tested are listed in Table 5.

TABLE 5

Halogen-Free Flame Retardants

| Flame Retardant 1 | Bisphenol A-Diphenyl Phosphate (BPADP) CAS Reg. No. 5945-33-5, from Chemtura, having the tradename Reofos BAPP. |
|---|---|
| Flame Retardant 2 | Polyphosphonate, Cas Reg.No. "trade secret", from FRX Polymers, having the tradename Nofia ™ HM1100. |
| Flame Retardant 3 | Phosphazene, CAS Reg. No. 260408-02-4, from Otsuka, having the tradename SPB100. |
| Flame Retardant 4 | Solid Phosphonate ester, CAS Reg. No. "trade secret", from ICL-IP, having the tradename Fyrolflex Sol-DP. |

Tables 6A and 6B summarize the composition and testing properties of the CEX9-13. Tables 7A and 7B summarize the composition and testing properties of the EX-7-15. The results indicate that BPADP (Flame Retardant 1) can be replaced by other halogen-free flame retardants. Greater quantities of flame retardant are tolerated when BPADP (Flame Retardant 1) is replaced by Flame retardant 2, 3, or 4. Samples containing more than about 7 weight percent of BPADP was used failed BPT (CEX10-11), whereas samples containing more than about 7 weight percent of Flame Retardants 2, 3, or 4 passed BPT (EX9, 12, and 15).

TABLE 6A

Composition of Comparative Examples 9-13

| Component | CEX 9 | CEX 10 | CEX 11 | CEX 12 Old EX13 | CEX 13 Old Ex14 |
|---|---|---|---|---|---|
| Polyester A | 20 | 20 | 20 | 20 | 20 |
| Polycarbonate A | 41.55 | 38.75 | 35.95 | 39.45 | 40.15 |
| Polycarbonate B | 30 | 30 | 30 | 30 | 30 |
| Flame Retardant 1 | 5.1 | 7.9 | 10.7 | 3.9 | 3.9 |
| Flame Retardant 2 | — | — | — | 3.9 | — |
| Flame Retardant 3 | — | — | — | — | 2.6 |
| Flame Retardant 4 | — | — | — | — | — |
| Encapsulated PTFE | 0.8 | 0.8 | 0.8 | 0.8 | 0.8 |
| Oxidant 1 | 0.15 | 0.15 | 0.15 | 0.15 | 0.15 |

TABLE 6A-continued

Composition of Comparative Examples 9-13

| Component | CEX 9 | CEX 10 | CEX 11 | CEX 12 Old EX13 | CEX 13 Old Ex14 |
|---|---|---|---|---|---|
| UV Stabilizer | 0.27 | 0.25 | 0.27 | 0.25 | 0.25 |
| Filler | 2 | 2 | 2 | 2 | 2 |
| Quencher | 0.15 | 0.15 | 0.15 | 0.15 | 0.15 |
| Resin Ratios | | | | | |
| Polycarbonate:Polyester | 3.6 | 3.4 | 3.3 | 3.5 | 3.5 |
| BPA-PC:Polycarbonate A | 0.0 | 0.0 | 0.0 | 0.0 | 0.0 |
| Polycarbonate A:Polycarbonate B | 1.4 | 1.3 | 1.2 | 1.3 | 1.3 |

TABLE 6B

Testing Properties of Comparative Examples 9-13

| | CEX 9 | CEX 10 | CEX 11 | CEX 12 | CEX 13 |
|---|---|---|---|---|---|
| Impact kJ/m$^2$ | 13 | 12 | 10 | 12 | 13 |
| UL94 V-0 | PASS | PASS | PASS | PASS | PASS |
| GWFT @ 2 mm | PASS | PASS | PASS | PASS | PASS |
| BPT | PASS | Fail | Fail | PASS | PASS |

TABLE 7A

Composition of Examples 7-15

| Component | EX 7 | EX 8 | EX 9 | EX 10 | EX 11 | EX 12 | EX 13 | EX 14 | EX 15 |
|---|---|---|---|---|---|---|---|---|---|
| Polyester A | 20 | 20 | 20 | 20 | 20 | 20 | 20 | 20 | 20 |
| Polycarbonate A | 42.35 | 39.95 | 37.65 | 43.25 | 41.45 | 39.55 | 42.35 | 39.95 | 37.65 |
| Polycarbonate B | 30 | 30 | 30 | 30 | 30 | 30 | 30 | 30 | 30 |
| Flame Retardant 1 | — | — | — | — | — | — | — | — | — |
| Flame Retardant 2 | 4.3 | 6.7 | 9 | — | — | — | — | — | — |
| Flame Retardant 3 | — | — | — | 3.4 | 5.2 | 7.1 | — | — | — |
| Flame Retardant 4 | — | — | — | — | — | — | 4.3 | 6.7 | 9 |
| Encapsulated PTFE | 0.8 | 0.8 | 0.8 | 0.8 | 0.8 | 0.8 | 0.8 | 0.8 | 0.8 |
| Oxidant 1 | 0.15 | 0.15 | 0.15 | 0.15 | 0.15 | 0.15 | 0.15 | 0.15 | 0.15 |
| UV Stabilizer | 0.27 | 0.25 | 0.27 | 0.25 | 0.25 | 0.25 | 0.25 | 0.25 | 0.25 |
| Filler | 2 | 2 | 2 | 2 | 2 | 2 | 2 | 2 | 2 |
| Quencher | 0.15 | 0.15 | 0.15 | 0.15 | 0.15 | 0.15 | 0.15 | 0.15 | 0.15 |
| Resin Ratios | | | | | | | | | |
| Polycarbonate:Polyester | 3.6 | 3.5 | 3.4 | 3.7 | 3.6 | 3.5 | 3.6 | 3.5 | 3.4 |
| BPA-PC:Polycarbonate A | 0.0 | 0.0 | 0.0 | 0.0 | 0.0 | 0.0 | 0.0 | 0.0 | 0.0 |
| Polycarbonate A:Polycarbonate B | 1.4 | 1.3 | 1.3 | 1.4 | 1.4 | 1.3 | 1.4 | 1.3 | 1.3 |

TABLE 7B

Properties of Examples 7-15

| | EX 7 | EX 8 | EX 9 | EX 10 | EX 11 | EX 12 | EX 13 | EX 14 | EX 15 |
|---|---|---|---|---|---|---|---|---|---|
| Impact kJ/m$^2$ | 16 | 12 | 13 | 18 | 17 | 16 | 15 | 13 | 12 |
| UL94 V-0 | PASS | PASS | PASS | PASS | PASS | PASS | PASS | PASS | PASS |
| GWFT @ 2 mm | PASS | PASS | PASS | PASS | PASS | PASS | PASS | PASS | PASS |
| BPT | PASS | PASS | PASS | PASS | PASS | PASS | PASS | PASS | PASS |

The foregoing invention has been described in some detail by way of illustration and example for purposes of clarity and understanding. The invention has been described with reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled. All patents, patent applications, and publications cited in this application are hereby incorporated by reference in their entirety for all purposes to the same extent as if each individual patent, patent application, or publication were so individually denoted.

The invention claimed is:

1. A composition comprising:
   (a) 10 to 50 percent by weight of a polyester;
   (b) 20 to 70 percent by weight of Polycarbonate A which is a copolycarbonate of 2-phenyl-3,3-bis(4-hydroxyphenyl)phthalimidine (PPPBP) and another bisphenol;
   (c) 10 to 60 percent by weight of Polycarbonate B, which is a polycarbonate-polysiloxane copolymer; and
   (d) 4 to 10 percent by weight of a non-halogenated flame retardant provided that when the non-halogenated flame retardant is an organophosphate, organophosphonate, or organophosphinate, the weight percent is 4 to 7 percent by weight; wherein:

the weight percents are based on the total weight of the composition and the composition passes the following tests:
- (i) the Ball Pressure Test according to (IEC) DIN EN 60695-10-2, VDE 0471 Part 10-2 or (IEC) DIN EN 60335-1 at 125° C.; or
- (ii) the Glow Wire Flammability Test (IEC) 60695-2-12 at 850° C.; and
- (iii) has a UL94 Vertical Flame Rating, V-0 at 1.5 mm.

2. The composition of claim 1, comprising:
- (a) 14 to 30 percent by weight of a polyester;
- (b) 30 to 60 percent by weight of Polycarbonate A; and
- (c) 20 to 50 percent by weight of Polycarbonate B.

3. The composition of claim 2, comprising:
- (a) 15 to 28 percent by weight of a polyester;
- (b) 32 to 68 percent by weight of Polycarbonate A; and
- (c) 22 to 48 percent by weight of Polycarbonate B.

4. The composition of claim 3, comprising:
- (a) 15 to 28 percent by weight of a polyester;
- (b) 32 to 68 percent by weight of Polycarbonate A; and
- (c) 22 to 40 percent by weight of Polycarbonate B.

5. The composition of any one of claims 1-4, wherein
- (a) the polyester is polyethylene terephthalate (PET) or polybutylene terephthalate (PBT);
- (b) Polycarbonate A is a copolymer of PPPBP and bisphenol-A;
- (c) Polycarbonate B is a polycarbonate/polydimethylsiloxane (PC/PDMS) copolymer.
- (d) the non-halogenated flame retardant is selected from the group consisting of bisphenol-A bis(diphenylphosphate (BPADP), Polyphosphonate, Phosphazene, and Solid Phosphonate ester.

6. The composition of claim 5, comprising 4 to 7 percent by weight of a non-halogenated flame retardant.

7. The composition of claim 5, comprising 4 to 10 percent by weight of a non-halogenated flame retardant provided that the non-halogenated flame retardant is not an organophosphate, organophosphonate, or organophosphinate flame retardant.

8. The composition of claim 7, wherein the non-halogenated flame retardant is selected from the group consisting of Polyphosphonate, Phosphazene, and Solid Phosphonate ester.

9. A composition comprising:
- (a) 15 to 28 percent by weight of PET or PBT;
- (b) 32 to 68 percent by weight of Polycarbonate A which is a copolymer of PPPBP and bisphenol-A;
- (c) 22 to 48 percent by weight of Polycarbonate B which is a polycarbonate/polydimethylsiloxane (PC/PDMS) copolymer; and
- (d) 4 to 7 percent by weight of organophosphate, organophosphonate, or organophosphinate non-halogenated flame retardant.

10. The composition of claim 9, comprising 4 to 7 percent by weight of BPADP.

11. A composition comprising:
- (a) 15 to 28 percent by weight of PET or PBT;
- (b) 32 to 68 percent by weight of Polycarbonate A which is a copolymer of PPPBP and bisphenol-A;
- (c) 22 to 48 percent by weight of Polycarbonate B which is a polycarbonate/polydimethylsiloxane (PC/PDMS) copolymer; and
- (d) 4 to 10 percent by weight of a non-halogenated flame retardant provided that the non-halogenated flame retardant is not an organophosphate, organophosphonate, or organophosphinate flame retardant.

12. The composition of claim 11, comprising 4 to 10 percent by weight of non-halogenated flame retardant which is selected from the group consisting of Polyphosphonate, Phosphazene, and Solid Phosphonate.

13. An article comprising the composition of claim 1.

* * * * *